(12) United States Patent
Moore

(10) Patent No.: US 8,578,327 B2
(45) Date of Patent: Nov. 5, 2013

(54) TARGETED TO TARGETLESS APPLICATION CONVERTER

(75) Inventor: Devin C. Moore, Lewis Center, OH (US)

(73) Assignee: Verizon Patent Licensing Inc., Basking Ridge, NJ (US)

( * ) Notice: Subject to any disclaimer, the term of this patent is extended or adjusted under 35 U.S.C. 154(b) by 576 days.

(21) Appl. No.: 12/625,256

(22) Filed: Nov. 24, 2009

(65) Prior Publication Data

US 2011/0126169 A1    May 26, 2011

(51) Int. Cl.
*G06F 11/00* (2006.01)
*G06F 9/44* (2006.01)
*G06F 9/45* (2006.01)
*H04N 7/16* (2011.01)

(52) U.S. Cl.
USPC .......... 717/106; 714/38.1; 717/101; 717/105; 717/108; 717/120; 717/125; 717/124; 717/136; 717/140; 717/143; 717/170; 725/13

(58) Field of Classification Search
None
See application file for complete search history.

(56) References Cited

U.S. PATENT DOCUMENTS

| | | | | |
|---|---|---|---|---|
| 3,711,863 | A * | 1/1973 | Bloom | 714/38.1 |
| 6,467,079 | B1 * | 10/2002 | Ettritch et al. | 717/108 |
| 7,103,875 | B1 * | 9/2006 | Kaneko et al. | 717/125 |
| 7,533,372 | B2 * | 5/2009 | Rettig et al. | 717/136 |
| 2002/0162090 | A1 * | 10/2002 | Parnell et al. | 717/120 |
| 2004/0015816 | A1 * | 1/2004 | Hines et al. | 717/101 |
| 2006/0085465 | A1 * | 4/2006 | Nori et al. | 707/101 |
| 2006/0206867 | A1 * | 9/2006 | Parsons et al. | 717/124 |
| 2007/0061789 | A1 * | 3/2007 | Kaneko et al. | 717/140 |
| 2009/0037873 | A1 * | 2/2009 | Ahadian et al. | 717/105 |
| 2010/0083298 | A1 * | 4/2010 | Gray et al. | 725/13 |
| 2010/0115500 | A1 * | 5/2010 | Seiffert | 717/143 |
| 2010/0131940 | A1 * | 5/2010 | Jazdzewski | 717/170 |

OTHER PUBLICATIONS

Keith D. Cooper et al., Enhanced Code Compression for Embedded RISC Processors, May 1999, [Retrieved on May 9, 2013]. Retrieved from the internet: <URL: http://dl.acm.org/citation.cfm?id=301655> 11 Pages (139-149).*

* cited by examiner

*Primary Examiner* — Don Wong
*Assistant Examiner* — Anibal Rivera

(57) ABSTRACT

A system includes a source database storing a targeted source code having references to hard-coded configuration information. A converter is in communication with the source database and is configured to replace the hard-coded configuration information in the targeted source code with soft-coded configuration information. A method includes searching the targeted source code for references related to hard-coded configuration information, receiving new reference names for the references, each of the new reference names corresponding to at least one of the references and being related to soft-coded configuration information, and replacing the references related to hard-coded configuration information with the corresponding new reference name to generate a targetless source code with the soft-coded configuration information.

25 Claims, 4 Drawing Sheets

TARGETED TO TARGETLESS APPLICATION CONVERTER

BACKGROUND

Targeted applications are software applications that include hard-coded configuration information related to a hardware device executing the software. Because the software was written with a specific hardware device in mind, only the hardware device for which the software was written may execute the software. Targetless applications, on the other hand, are hardware independent because the configuration information is not hard-coded into the source code. This means that targetless applications can receive configuration information directly from the hardware device running the software. Thus, many different computing devices may execute targetless applications without substantial revisions to the source code.

To convert a software application from a targeted application to a targetless application, a programmer must manually remove all references in the targeted application to configuration information, and replace all the references with computer code that receives the configuration information from the external source. This is a very time consuming process, especially if the source code has millions of lines of code. Accordingly, a converter is needed that can convert targeted applications to targetless applications.

DETAILED DESCRIPTION

An exemplary system includes a source database storing a targeted source code having references to hard-coded configuration information. A converter is in communication with the source database and is configured to replace the hard-coded configuration information in the targeted source code with soft-coded configuration information to generate a targetless source code that may receive the configuration information from external sources. Moreover, the converter may use version control information to generate multiple versions of the targetless source code.

With soft-coded configuration information, the targetless source code may be compiled and executed on different types of hardware devices. For example, the hardware device executing the targetless source code may provide the targetless source code with the configuration information of the hardware device. Targeted source code, on the other hand, is limited to specific hardware devices because the hardware devices do not supply the configuration information.

Figure 1:
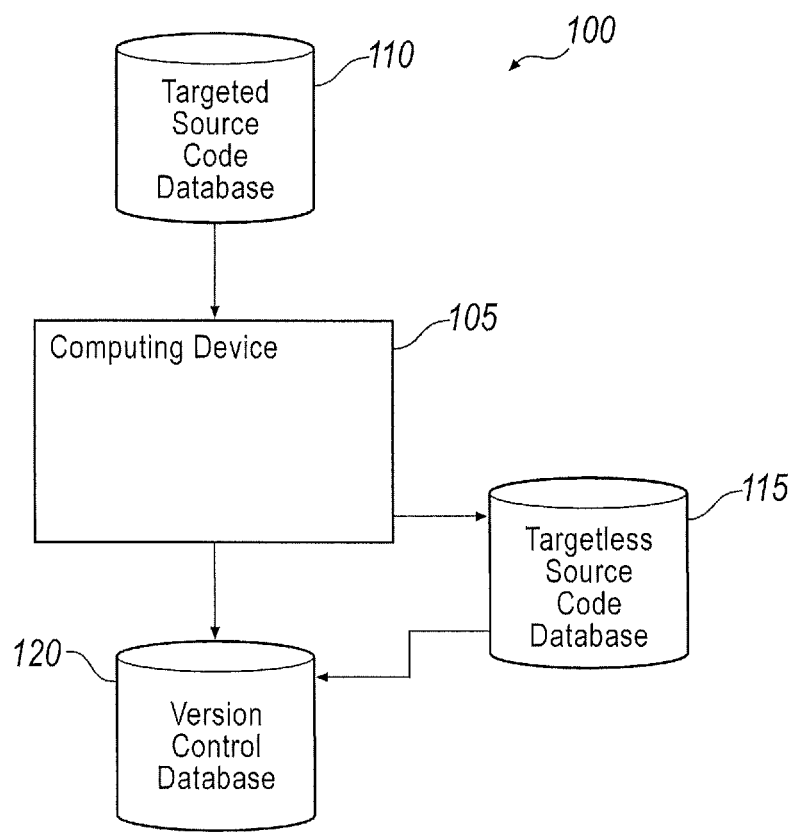
FIG. 1 illustrates an exemplary system for converting targeted applications into targetless applications.

FIG. 1 illustrates an exemplary system 100 having a computing device 105 in communication with a targeted source code database 110, a targetless source code database 115, and a version control database 120. The system 100 may take many different forms and include multiple and/or alternate components and facilities. While an exemplary system 100 is shown in the figures, the exemplary components illustrated are not intended to be limiting. Indeed, additional or alternative components and/or implementations may be used.

The computing device 105 may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices 105 include, without limitation, a computer workstation, a server, a desktop, notebook, laptop, or handheld computer, or some other known computing system and/or device.

Computing devices 105 generally include computer-executable instructions, where the instructions may be executable by one or more computing devices 105 such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The targeted source code database 110 may be in communication with the computing device 105 and may be configured to store one or more targeted source codes. The targeted source code database 110 may store one or more individual source code files or source code files that are part of a source code tree. Targeted source codes may include any code with hard-coded configuration information targeted to a specific hardware device. The hard-coded configuration information may, for instance, be embedded into the targeted source code itself so that it need not be obtained from the hardware device executing the targeted source code. Accordingly, targeted source codes with hard-coded configuration information may be compiled and executed on the specific hardware devices corresponding to the configuration information hard-coded into the source code.

The targetless source code database 115 may be in communication with the computing device 105 and may be configured to store one or more targetless source codes. As discussed in greater detail below, one or more of the targetless source codes stored in the targetless source code database 115 may be generated from one or more of the targeted source codes stored in the targeted source code database 110. Like the targetless source codes, the targeted source codes may be stored as individual files or be arranged in a source code tree. The targetless source codes may include soft-code configuration information. For example, targetless source codes with soft-coded configuration information may receive the configuration information from an external source, including the hardware device on which the targeted source code is executed. This way, the targetless source code may be executed by many any type of hardware devices capable of providing the necessary configuration information. Thus, many hardware devices may execute targetless source codes while targeted source codes may only be executed by a limited number of hardware devices.

The version control database 120 may be in communication with the computing device 105 and the targetless source code database 115. The version control database 120 may store version information for one or more targetless source codes. The version information may include revisions to the source code, a revision number, a timestamp, a user identification that identifies a user who made a change to the source code, etc. The computing device 105 may be configured to access the version control database 120 to access one or more versions of the targetless source code. For example, the user may be able to access test, production, or future release versions of the targetless source code from the version control database 120.

Databases, data repositories or other data stores described herein, such as the targeted source code database 110, the targetless source code database 115, and the version control database 120, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices 105 (e.g., servers, personal computers, etc.), stored on computer readable media associated therewith (e.g., disks, memories, etc.). A computer program product may comprise such instructions stored on computer readable media for carrying out the functions described herein.

Figure 2:
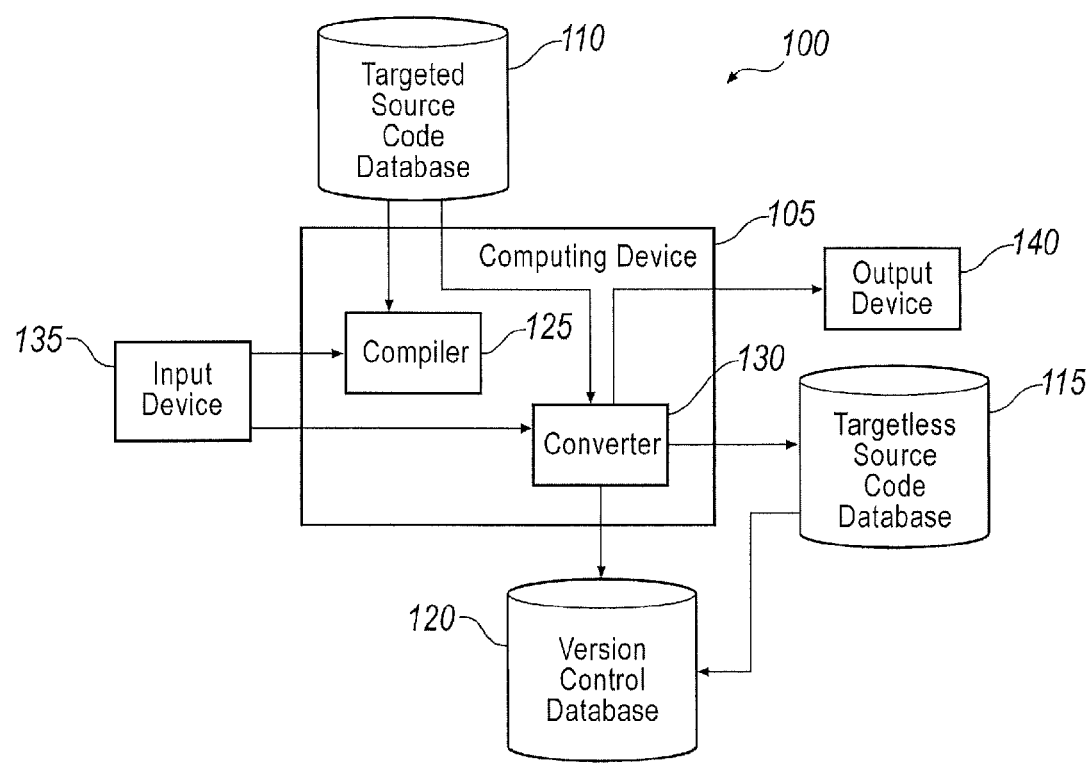
FIG. 2 illustrates an exemplary system having a computing device with a compiler and a converter that is configured to convert targeted applications into targetless applications.

Referring now to FIG. 2, the computing device 105 may include any number of hardware and software devices, or a combination thereof. For instance, the computing device 105 may include a compiler 125 that is in communication with the targeted source code database 110 and that is configured to compile targeted or targetless source codes. Furthermore, the computing device 105 may include a converter 130 in communication with the targeted source code database 110, the targetless source code database 115, and the version control database 120. The converter 130 may be configured to convert targeted source code to targetless source code, as described in further detail below. Moreover, the computing device 105 may include one or more input devices 135 and output devices 140 in communication with the compiler 125, the converter 130, or both.

The compiler 125 may include any computer program or set of computer programs configured to transform targeted or targetless source code from a high-level programming language to a low-level programming language. For instance, the compiler 125 may transform the source code from a human-readable computer language into machine code or an assembly language. The compiler 125 may include a native or hosted compiler 125 that outputs a compiled source code to run on a platform similar to the computing device 105 on which the compiler 125 operates. The compiler 125 may also or alternatively include a cross compiler 125 that outputs a compiled source code configured to operate on a different platform. Moreover, the compiler 125 may output a compiled source code for a virtual machine that may be operated on different types of platforms. Furthermore, various types of compilers 125 may be used with the computing device 105. For instance, the compiler 125 may include a one-pass compiler or a multi-pass compiler. Various multi-pass compilers include source-to-source compilers, stage compilers, or just-in-time compilers. Alternatively, the compiler 125 may include a front-end compiler, a back-end compiler, or the like.

The converter 130 may be configured to receive various inputs form the computing device 105, the input device 135, and one or more databases, such as the targeted source database, and output data for display on the output device 140 or for storage in one or more databases, such as the targetless source code database 115 or the version control database 120. The converter 130 may be configured to receive one or more targeted source codes from the source code database and output one or more targetless source codes to the targetless source code database 115.

In one exemplary approach, the converter 130 may be configured to generate the targetless source code from the targeted source code by finding references to hard-coded configuration information in the targeted source code and replacing the hard-coded configuration information in the targeted source code with new references related to soft-coded configuration information. The converter 130 may output the targetless source code with the soft-coded configuration information to the targetless source code database 115. By not being limited to hard-coded configuration information, the targetless source code may be compiled and executed on various types of hardware devices, regardless of the configuration information.

In one exemplary approach, the converter 130 may be configured to search the targeted source code for references to hard-coded configuration information and generate a temporary file (see FIG. 3) listing all occurrences of the references based upon the search. The converter 130 may also identify a location in the targeted source code of each reference uncovered during the search and list the location in the temporary file. The converter 130 may further receive new reference names corresponding to soft-coded configuration information for one or more of the references. The converter 130 may generate the targetless source code based on the temporary file and the new reference names by finding each occurrence of each of the references from the location of the references listed in the temporary file. The converter 130 may replace each occurrence of at least one of the references with one of the new reference names. To do so, the converter 130 or computing device 105 may include an expression parser or another hardware or software device to analyze and identify strings in the targeted source code.

The expression parser may be configured to identify sequences in the source code. For example, the parser may be configured to perform a lexical analysis by dividing the source code into symbols or groups of symbols. The symbols or groups of symbols may be identified using regular expressions. Alternatively, the parser may be configured to receive inputs that identify important symbols or groups of symbols. The parser may associate each symbol or group of symbols with a token to separate each of the symbols or groups of symbols. The parser may further perform a syntactic analysis that may include determining whether each of the tokens forms an allowable expression. Thus, using an expression parser, the converter 130 may be configured to identify the symbols or groups of symbols representing hard-coded configuration information in the source code, and replace the hard-coded configuration information with the new reference names corresponding to soft-coded configuration information.

In addition, the converter 130 may be configured to output a log file (see FIG. 3) that identifies differences between the targeted source code and the targetless source code. For example, a user may view the log file to verify that the converter 130 correctly converted the targeted source code to the targetless source code. Alternatively, the converter 130 may automatically determine whether the converter 130 correctly generated the targetless source code by comparing the temporary file to the log file. For example, the log file may list each location in the targeted source code where a reference to hard-coded configuration information appears as well as each location in the targetless source code where the references were replaced with new reference names corresponding to soft-coded configuration information. The temporary file may include the location of each reference to hard-coded configuration information. Therefore, the converter 130 may determine whether each location referenced by the temporary file has a corresponding entry in the log file. If so, the converter 130 may determine that the targetless source code was created correctly. If not, the converter 130 may be configured to indicate that there was an error with the previous conversion and that the conversion should be attempted again.

The converter 130 may be further configured to receive version information from, for example, a user or the version control database 120. The converter 130 may use the version information to generate different versions of the targetless source code. For example, the version information may include past release information, future release information, and present release information. Past release information may indicate that the source code is a previous release and currently being used in a commercial (i.e., production) environment. Future release information may apply to source codes that are being developed but have not yet been released commercially. Present or release information may be used with source codes that have been released but need minor changes, or may be used with source codes that have been released for testing purposes.

The converter 130 may be further configured to output a version log file (see FIG. 3) that identifies differences between two or more versions of the targetless source code. The version log file may identify when changes were made to the different targetless source code versions, the person who made the changes, the time the changes were made, etc. This way, the user may see the differences between different versions of the targetless source code and ensure that the appropriate targetless source code is used. For example, the user may view differences between a future release source code and a present release source code so that the correct version may be introduced into a commercial environment.

The input device 135 may include any device configured to receive inputs from a user or output data or control signals to the computing device 105. For example, the input device 135 may include a keyboard or mouse. The input device 135 may be integrated into the computing device 105 or may be a peripheral device that connects to a port of the computing device 105. For example, the input device 135 may connect to the computing device 105 using a universal serial bus port. The user may use the input device 135 to control various aspects of the computing device 105 and cause the input device 135 to output files (i.e., targetless source code files) or output to the output device 140 for viewing by the user.

The output device 140 may include any device configured to display information from the computing device 105. For example, the output device 140 may include a monitor. The output device 140 may be integrated into the computing device 105 or connect to the computing device 105 through a port, such as a VGA port, a HDMI port, a DVI port, or the like. To accommodate the output device 140, the computing device 105 may include a graphics card. The output device 140 may be configured to display various files generated by the converter 130. For example, the output device 140 may display the temporary file that lists each occurrence of references to hard-coded configuration information, the log file that lists changes made by the converter 130, the version log file identifying differences between the different versions of the targetless source code, or any combination thereof.

Figure 3:
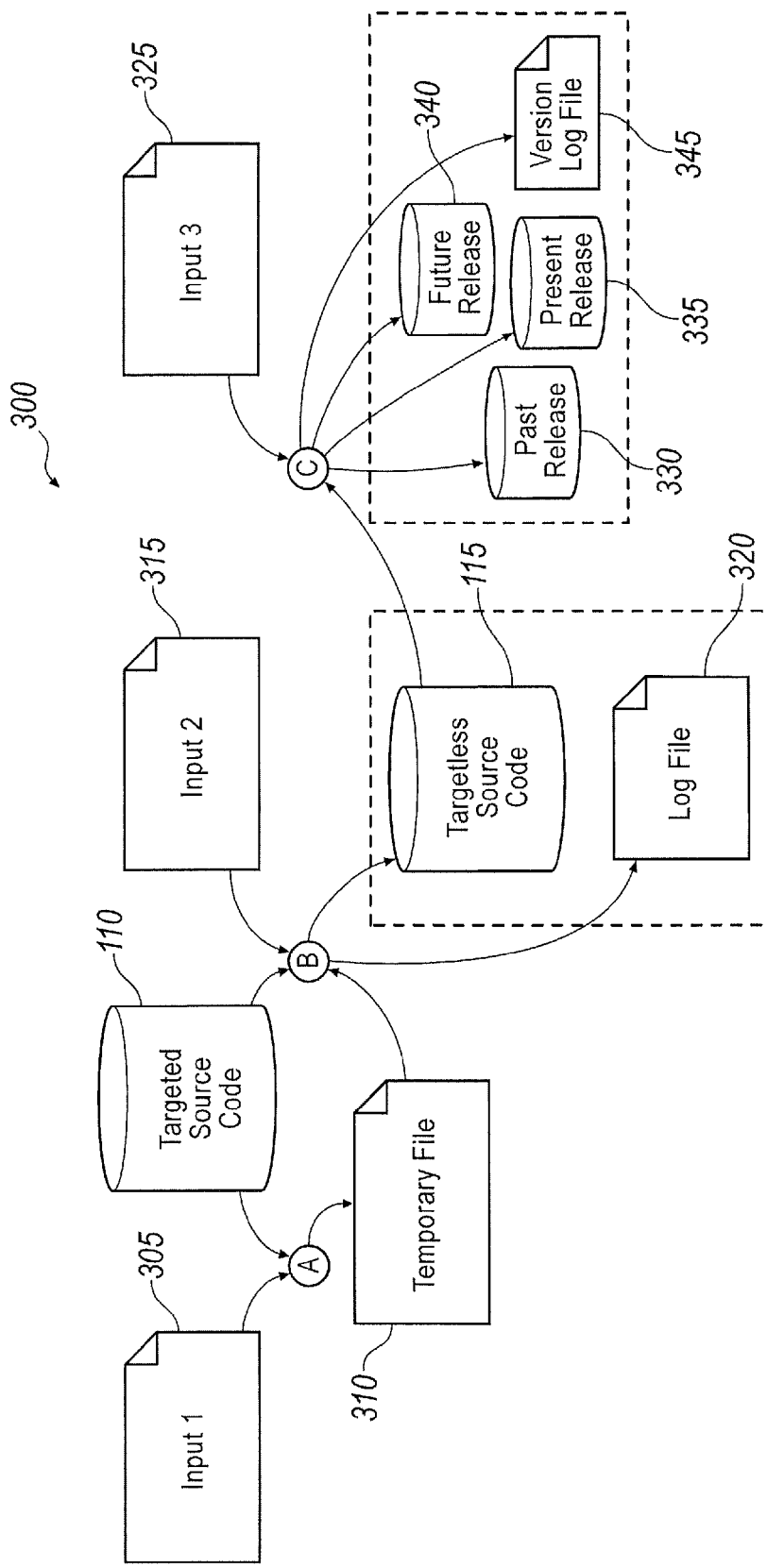
FIG. 3 illustrates exemplary inputs and outputs of the system of FIGS. 1 and 2.

FIG. 3 illustrates exemplary inputs and outputs 300 of the converter 130. At point A, the converter 130 may receive a targeted source code and a first input 305 that includes reference names corresponding to hard-coded configuration information. The first input 305 may be provided manually by a user or may be automatically generated by the computing device 105. For example, the user or the computing device 105 may generate a table listing the references to hard-coded configuration, and the table may be used as the first input 305. In one exemplary approach, to generate the table, the computing device 105 may search the targeted source code for any references to hard-coded configuration information. The computing device 105 may present the table to the user for review. Upon the user's approval, the converter 130 may search the targeted source code for the references listed in the table and output the temporary file 310 that may include the references to change, the location of each reference in the targeted source code, including line numbers, and the like.

At point B, the converter 130 may receive the temporary file 310 created at point A, the targeted source code, and a second input 315 that includes new reference names. The new reference names in the second input 315 may be provided manually by the user or may be generated automatically by the computing device 105. Again, the new reference names correspond to soft-coded configuration information, while the reference names provided at point A correspond to hard-coded configuration information. The converter 130 may find each reference based on the location identified in the temporary file 310 and replace each reference with a corresponding new reference identified in the second input 315 to generate the targetless source code. The new references may correspond to soft-coded configuration information, and each reference to hard-coded configuration information may have a corresponding new reference with the soft-coded configuration information. The new references identified in the second input 315 may be provided by a user via, for example, the input device 135, or may be determined automatically by the computing device 105.

Once the targetless source code is generated, the converter 130 may output the targetless source code to the targetless source code database 115. The converter 130 may further output a log file 320 that shows the changes made to each of the references. This way, the user may review the log file 320 and verify that the converter 130 correctly replaced the references to hard-coded configuration information with the new references associated with soft-coded configuration information. Alternatively, the computing device 105, at point B, may compare the targeted source code to the newly generated targetless source code to identify the differences. The computing device 105 may compare the differences to the log file 320 to ensure that the log file 320 was successfully generated. Also, the computing device 105 may compare the differences to the temporary file 310, which as previously discussed, includes the location of the references to the hard-coded configuration information. Based on the locations identified in the temporary file 310 and the changes referenced in the log file 320, the computing device 105 may determine whether the targetless source code was successfully generated.

At point C, the converter 130 may receive a third input 325 from the user, from the computing device 105, or from the version control database 120. The third input 325 may include version control information. The converter 130 may further receive the targetless source code. The converter 130 may apply the version control information to the targetless source code to generate different versions of the targetless source code. For example, if the version control information indicates that the targeted source code was used to generate past, present, and future releases, the converter 130 may further generate past, present, and future releases of the targetless source code.

Moreover, the converter 130 may output a version log file 345 that indicates the differences between each of the versions of the targetless source code generated. As illustrated in FIG. 3, the converter 130 generated three versions of the targetless source code: a past release version 330, a present release version 335, and a future release version 340. The version log file 345 may identify the differences between each of these versions, the date and time the changes were made, the user who made the changes, etc.

Figure 4:
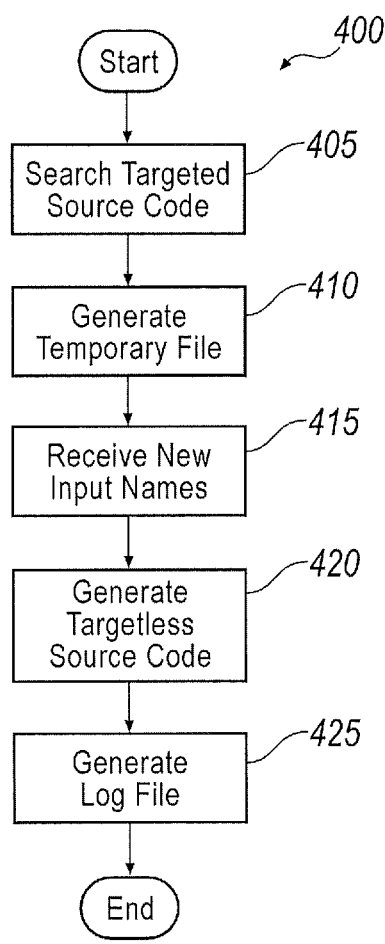
FIG. 4 illustrates an exemplary process performed by the systems of FIGS. 1 and 2.

FIG. 4 illustrates an exemplary process 400 that may be performed by the system. Block 405 may include searching one or more of the targeted search codes stored in the targeted search code database. For example, the converter 130 may access the targeted search code database via the computing device 105. In response to a query from the user, the converter 130 may search for references in the targeted source code, as well as identify the locations of each reference in the targeted source code. As previously discussed, the references in the targeted search code may correspond to hard-coded configuration information.

Block 410 may include generating the temporary file 310. The temporary file 310 may be generated by the converter 130 and include the list of the references in the targeted source code that were uncovered by the search performed at block 405. Moreover, the temporary file 310 may include the locations of each reference in the targeted source code. Specifically, the converter 130 may identify the location in the targeted source of each reference uncovered during the search of the targeted source code and list the location in the temporary file 310. Furthermore, the converter 130 may output the temporary file 310 to the output device 140.

Block 415 may include receiving new reference names at, for example, the converter 130. The new reference names may be generated automatically or be received from the user. In one exemplary approach, the new reference names correspond to soft-coded configuration information. Moreover, each new reference name may correspond to one of the references related to hard-coded configuration information.

Block 420 may include generating the targetless source code. For instance, the converter 130 may generate the targetless source code by replacing the references related to hard-coded configuration information with the corresponding new reference name. In one exemplary approach, the converter 130 may find each occurrence of each of the references based on the location listed in the temporary file 310. The converter 130 may use a "find and replace" feature to replace each occurrence of the reference found with the new reference. In this way, for example, the converter 130 may remove all references to hard-coded configuration information from the targeted source code. Accordingly, the targetless source code may only include the new references with the soft-coded configuration information.

Block 425 may include generating a log file 320 identifying the differences between the targeted source code and the targetless source code. The converter 130 may generate the log file 320 and output the log file 320 to the output device 140. Once outputted, the user may view the log file 320 to verify that the converter 130 correctly replaced the references referring to hard-coded configuration information with the new references referring to soft-coded configuration information. Moreover, the converter 130 may analyze the log file 320 to automatically determine whether the appropriate changes were made. For example, the converter 130 may compare the log file 320 to the temporary file 310. If the changes indicated in the log file 320 match the temporary file 310, the converter 130 may indicate to the user that the targetless source code was generated correctly. If not, the converter 130 may indicate to the user that the targetless source code was not generated correctly. In one exemplary approach, the converter 130 may automatically generate the targetless source code again if the previous attempt was unsuccessful.

The process 400 of FIG. 4 may end after step 425.

Figure 5:
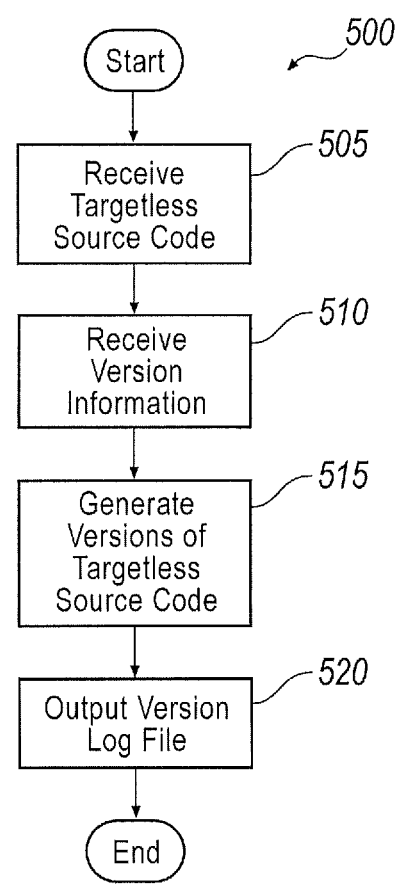
FIG. 5 illustrates another exemplary process performed by the systems of FIGS. 1 and 2.

FIG. 5 illustrates another exemplary process 500 that may be performed by the system. In the process 500 of FIG. 5, block 505 may include the targetless source code. For example, the converter 130 may receive the targetless source code from the targetless source code database 115.

Block 510 may include receiving version information. The version information may be provided to the converter 130 from the version control database 120 via the computing device 105. The version information may include revisions to the source code, a revision number, a timestamp, a user identification that identifies a user who made a change to the source code, etc. For example, the version information may indicate that the targeted source code was for a past, present, or future release 340.

Block 515 may include generating versions of the targetless source code that correspond to the version information. For instance, the converter 130 may identify the targeted source code as having three versions: a past version, a present version, and a future version. Therefore, the converter 130 may generate three different versions of the targetless source code. The past version of the targetless source code corresponds to the past version of the targeted source code, the present version of the targetless source code corresponds to the present version of the targeted source code, and the future version of the targetless source code corresponds to the future version of the targeted source code.

Block 520 may include outputting a version log file 345 that identifies the differences between the different versions of the targetless source code. The version log file 345 may be displayed on the output device 140 to the user.

The process 500 of FIG. 5 may end after step 520.

Conclusion

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

I claim:

1. A system having a processor, the system comprising:
   a source database storing a targeted source code having references to hard-coded configuration information;
   a converter in communication with said source database and configured to replace the hard-coded configuration information in said targeted source code with soft-coded configuration information to generate targetless source code, and wherein the converter is configured to output a log file identifying differences between said targeted source code and said targetless source code,
   wherein the converter is configured to search said targeted source code, generate a temporary file listing all occurrences of references to hard-coded configuration information in the targeted source code based upon the search of said targeted source code, and compare the temporary file to the log file to determine whether the targetless source code was correctly generated.

2. A system as set forth in claim 1, wherein said converter is configured to identify a location in said targeted source code of each reference uncovered in the search of said targeted source code and list said location in said temporary file.

3. A system as set forth in claim 1, wherein said converter is configured to receive new reference names for one or more of said references, wherein each of said new reference names corresponds to at least one of said references and includes soft-coded configuration information.

4. A system as set forth in claim 3, wherein said converter is configured to generate the targetless source code based on said temporary file and said new reference names.

5. A system as set forth in claim 3, wherein said converter is configured to find each occurrence of each of said references based on the location listed in said temporary file.

6. A system as set forth in claim 5, wherein said converter is configured to replace each occurrence of at least one of said references with one of said new reference names.

7. A system as set forth in claim 4, wherein said converter is configured to receive version information and generate at least two versions of said targetless source code corresponding to said version information.

8. A system as set forth in claim 7, wherein said version information includes at least one of past release information, future release information, and present release information.

9. A system as set forth in claim 8, wherein said converter is configured to output a version log file identifying differences between said at least two versions of said targetless source code.

10. A system as set forth in claim 1, wherein the converter is configured to compare the temporary file to the log file by matching locations of all occurrences of the references to hard-coded configuration information in the temporary file to locations of all occurrences in the log file.

11. A system as set forth in claim 1, wherein the converter is configured to generate the temporary file by applying an expression parser to the targeted source code.

12. A method comprising:
    searching a targeted source code for references related to hard-coded configuration information;
    receiving new reference names for the references, each of the new reference names corresponding to at least one of the references and being related to soft-coded configuration information;
    replacing the references related to hard-coded configuration information with the corresponding new reference name to generate a targetless source code with the soft-coded configuration information;
    generating a log file identifying differences between the targeted source code and the targetless source code;
    generating a temporary file listing all occurrences of the references in the targeted source code; and
    comparing the temporary file to the log file to determine whether the targetless source code was correctly generated.

13. A method as set forth in claim 12, further comprising:
    identifying a location in the targeted source code of each reference uncovered in the search of the targeted source code; and
    listing the location in the temporary file.

14. A method as set forth in claim 13, further comprising finding each occurrence of each of the references based on the location listed in the temporary file.

15. A method as set forth in claim 12, further comprising:
    receiving version information; and
    generating at least two versions of the targetless source code corresponding to the version information.

16. A method as set forth in claim 15, further comprising outputting a version log file identifying differences between the at least two versions of the targetless source code.

17. A method as set forth in claim 12, wherein the comparing of the temporary file to the log file includes matching locations of all occurrences of the references to hard-coded configuration information in the temporary file to locations of all occurrences in the log file.

18. A method as set forth in claim 12, wherein generating the temporary file includes applying an expression parser to the targeted source code.

19. A system having a processor, the system comprising:
a source database storing a targeted source code having references related to hard-coded configuration information;
a converter in communication with said source database and configured to replace the references related to hard-coded configuration information in said source code with corresponding new reference names related to soft-coded configuration information to generate a targetless source code with the soft-coded configuration information and output a log file identifying differences between said targeted source code and said targetless source code,
wherein the converter is configured to search said targeted source code, generate a temporary file listing all occurrences of references to hard-coded configuration information in the targeted source code based upon the search of said targeted source code, and compare the temporary file to the log file to determine whether the targetless source code was correctly generated to include all of the occurrences of the references to hard-coded configuration information.

20. A system as set forth in claim 19, wherein said converter is configured to identify a location in said targeted source code of each reference uncovered in the search of said targeted source code and list said location in said temporary file and find each occurrence of each of said references based on the location listed in said temporary file.

21. A system as set forth in claim 20, wherein said converter is configured to replace each occurrence of at least one of said references with one of said new reference names.

22. A system as set forth in claim 19, wherein said converter is configured to receive version information and generate at least two versions of said targetless source code corresponding to said version information.

23. A system as set forth in claim 22, wherein said version information includes at least one of past release information, future release information, and present release information.

24. A system as set forth in claim 23, wherein said converter is configured to output a version log file identifying differences between said at least two versions of said targetless source code.

25. A system as set forth in claim 19, wherein the converter is configured to generate the temporary file by applying an expression parser to the targeted source code and compare the log file to the temporary file by matching locations of all occurrences of the references to hard-coded configuration information in the temporary file to locations of all occurrences in the log file.

* * * * *